(12) United States Patent
Ohyama (10) Patent No.: US 7,178,737 B2
(45) Date of Patent: Feb. 20, 2007

(54) COMBINATION-TYPE IC CARD

(75) Inventor: Shigeo Ohyama, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/440,135

(22) Filed: May 19, 2003

(65) Prior Publication Data

US 2007/0012785 A1    Jan. 18, 2007

(30) Foreign Application Priority Data

May 23, 2002    (JP) ............................. 2002-149360

(51) Int. Cl.
*G06K 19/06* (2006.01)
(52) U.S. Cl. ...................... 235/492; 235/451; 235/488; 235/380; 235/441
(58) Field of Classification Search ................ 235/492, 235/451, 488, 380, 441; 375/219, 316, 315; 340/10.4
See application file for complete search history.

(56) References Cited

U.S. PATENT DOCUMENTS

| | | | |
|---|---|---|---|
| 5,426,286 A * | 6/1995 | Nair et al. ................... 235/449 |
| 5,534,686 A * | 7/1996 | Kowalski et al. ........... 235/492 |
| 6,199,763 B1 | 3/2001 | Thüringer et al. |
| 6,375,082 B1 | 4/2002 | Kobayashi et al. |
| 6,507,607 B1 * | 1/2003 | Hill ............................. 375/219 |
| 6,585,166 B1 * | 7/2003 | Ookawa et al. ............. 235/492 |
| 6,636,146 B1 * | 10/2003 | Wehoski ..................... 340/10.4 |
| 2001/0000405 A1 * | 4/2001 | Gray et al. .................. 235/375 |
| 2002/0003168 A1 * | 1/2002 | Takabayashi ................ 235/492 |
| 2004/0007617 A1 * | 1/2004 | Shaw et al. .................. 235/380 |
| 2004/0011874 A1 * | 1/2004 | Theodossiou et al. ...... 235/488 |
| 2004/0065734 A1 * | 4/2004 | Piikivi .......................... 235/451 |

FOREIGN PATENT DOCUMENTS

| | | |
|---|---|---|
| CN | 1231459 A | 10/1999 |
| EP | 0 945 828 A2 | 9/1999 |
| JP | 11-353441 A | 12/1999 |
| JP | 2001-502456 A | 2/2001 |

OTHER PUBLICATIONS

Foreign Combined Search and Examination Report dated Oct. 22, 2004.

* cited by examiner

*Primary Examiner*—Michael G. Lee
*Assistant Examiner*—Allyson N Trail
(74) *Attorney, Agent, or Firm*—Harness, Dickey & Pierce, P.L.C.

(57) ABSTRACT

A combination-type IC card is provided with both of (i) a contact-type interface for reading and writing data via contact-type communication terminals provided in a card, and (ii) a non-contact-type communication interface, which includes a non-contact-type communication parallel resonance circuit, for reading and writing data received, via an antenna coil, data transmitted via radio waves. Further, the combination-type IC card is provided with a contact/non-contact judging circuit for judging whether communication is contact-type communication or non-contact communication, by judging from a difference between (i) a frequency of a clock for contact communication, which is inputted via a clock terminal, which is one of the contact-type communication terminals, and (ii) a frequency of a clock for non-contact communication, which is received via the antenna coil. With this arrangement, it is possible to provide such combination-type IC card capable of accurately and stably judging whether the communication is the contact type or the non-contact type.

28 Claims, 8 Drawing Sheets

FIG. 7 (a) CLK

FIG. 7 (b) RFCLK

FIG. 7 (c) NON-CONTACT-TYPE COMMUNICATION MODE (HIGH/LOW)

FIG. 7 (d) SYSTEM RESET (1/0)

FIG. 8

COMBINATION-TYPE IC CARD

FIELD OF THE INVENTION

The present invention relates to a combination-type IC (Integrated Circuit) card including both of (i) a contact-type interface, which is used in a contact-type card for use in finance industry, such as ATM (Automatic Teller Machine) cards, and (ii) a non-contact-type interface, which is used in a non-contact-type card for use in transportation industry, such as cards used for trains, buses and the like. Especially, the present invention relates to an art for judging whether communication is contact-type communication or non-contact type communication.

BACKGROUND OF THE INVENTION

Two types of standards for communication interfaces for IC cards are currently used, or are going to be used in the future. One of the standards is for a contact-type card (clock: 3.5 MHz, 4.9 MHz) for use in the finance industry, such as ATM cards. The other one is for a non-contact-type card (clock: 13.56 MHz) for use in the transportation industry, such as cards for used for trains, buses and the like.

On the other hand, a combination-type IC card in which the functions of the cards of those two systems (standards) are integrated has been developed and in a market. High usability is attained by such combination-type IC card, which includes two types of interfaces, namely, a contact-type interface and a non-contact type interface, because only one combination-type card is necessary to deal with both the system of the finance industry in which the existing contact-type interface is used, and in the system of the transportation industry in which the non-contact-type interface is used.

Incidentally, the combination-type IC card requires means for judging which one of the contact-type interface and the non-contact-type interface is to be used in an environment in which the combination-type IC card is to be used. Conventionally, the combination-type IC card reads a clock from a machine to which the combination-type IC card is about to communicate, in order to judge whether the machine is the contact type or the non-contact type. In short, the judging is carried out by the combination-type IC card by reading the clock from the machine.

Specifically, for example, the Japanese Laid-Open Patent Application, Tokuhyo, No. 2001-502456 (published on Feb. 20, 2001) discloses an art in which presence and absence of clock in a signal from an antenna coil is used as a function so as to judge whether communication is the contact-type or the non-contact type. When the clock is present, it is judged that the communication is the non-contact type. When the clock is absent, it is judged that the communication is the contact type.

In this case, it is necessary to wait a certain length of time until operation is stabilized, for the non-contact type card, which starts operating with a signal and an energy supplied thereto from the machine in a form of an electromagnetic wave. Thus, the card of the non-contact type is so arranged as to be capable of normally operating after the judging in the type of the communication.

However, the antenna coil of the conventional combination-type IC card is a parallel resonance circuit, which is oscillated not only when receiving the clock of not 13.56 MHz for non-contact type communication, but also when receiving a clock of another frequency. Thus, it is a problem that the judging as to whether the communication is the contact type or the non-contact type cannot be performed stably by judging whether the clock for the non-contact type communication is present or absent. Specifically, in this art, even if a clock of another frequency but not the clock of not 13.56 MHz for non-contact type communication is received, there is a possibility that it is judged that the clock for non-contact type communication is present. This leads to erroneous operation of the combination-type IC card.

SUMMARY OF THE INVENTION

The present invention is contrived in view of the forgoing problems in the related arts, and has an object to provide a combination-type IC card capable of stably and accurately judging whether the communication is contact-type communication (contact communication) or non-contact type communication (non-contact communication).

A combination-type IC card of the present invention is, in order to solve the foregoing problems, provided with a contact-type interface for reading and writing data transmitted via contact terminals provided in the combination-type IC card; a non-contact-type interface for receiving, via an antenna coil, data transmitted thereto via radio waves, and for reading and writing the data thus transmitted thereto; and a judging section for judging whether communication is contact-type communication or non-contact type communication, by judging from a difference between a frequency of a clock for contact-type communication, and a frequency of a clock for non-contact type communication, the clock for contact-type communication being received via a CLK terminal, which is one of the contact-type terminals, and the non-contact-type clock being received via the antenna coil.

In the above invention, the judging section judges whether communication is contact-type communication or non-contact type communication, by judging from the difference between the frequency of the clock for contact-type communication and the frequency of the clock for non-contact type communication, the clock for contact-type communication being received via the CLK terminal, which is one of the contact-type terminals, and the non-contact-type clock being received via the antenna coil.

Because the clock for contact communication and the clock for non-contact communication to be supplied to the combination-type IC card are so distinctly different in terms of frequency, it is possible to provide a combination-type IC card capable of accurately and stably judging whether the communication is the contact type or the non-contact type, by discriminating between the frequencies of the clocks.

Moreover, a combination-type IC card of the present invention having the above arrangement is further provided with a setting section for setting so that a frequency of active one of the clock for contact-type communication and the clock for non-contact-type communication will be faster than a frequency of non-active one of the clock for contact-type communication and the clock for non-contact-type communication.

For judging the frequency of the clock for contact-type communication and that of the clock for non-contact-type communication, it is necessary that both the clocks are in an ON-state. However, if both the clocks have the same frequency, it is impossible to distinguish one of the clocks from the other.

Thus, in the present invention, the setting section sets so that a frequency of active one of the clock for contact-type communication and the clock for non-contact-type communication will be faster than a frequency of non-active one of the clock for contact-type communication and the clock for non-contact-type communication.

Thus, it is possible to arrange the setting section, such as a clock extraction circuit for non-contact-type communication as follows: in the non-contact-type communication, the frequency of the clock for contact-type communication is slower than that of the clock for non-contact-type communication, the clock for contact-type communication supplied from the CLK terminal and the clock for non-contact-type communication supplied from the antenna coil; and in the contact-type communication, the frequency of the clock for non-contact-type communication is slower than that of the clock for contact-type communication.

As a result, it is possible to provide a combination-type IC card capable of accurately and stably judging whether the communication is the contact-type communication or the non-contact-type communication.

Furthermore, a combination-type IC card of the present invention having the above arrangement is further provided with a control section for contact-type communication, for controlling communication of data via the contact-type interface; and a control section for non-contact-type communication, for controlling communication of data via the non-contact-type interface, the control section for contact-type communication and the control section for non-contact-type communication being provided individually.

In the above invention, individually provided are (i) the control section for contact-type communication, for controlling communication of data via the contact-type interface, and (ii) the control section for non-contact-type communication, for controlling communication of data via the non-contact-type interface.

With this arrangement, it is possible to realize the contact-type communication and the non-contact-type communication.

For a fuller understanding of the nature and advantages of the invention, reference should be made to the ensuing detailed description taken in conjunction with the accompanying drawings.

DESCRIPTION OF THE EMBODIMENTS

Described below is an embodiment of the present invention, referring to FIGS. 1 to 8.

Figure 1:
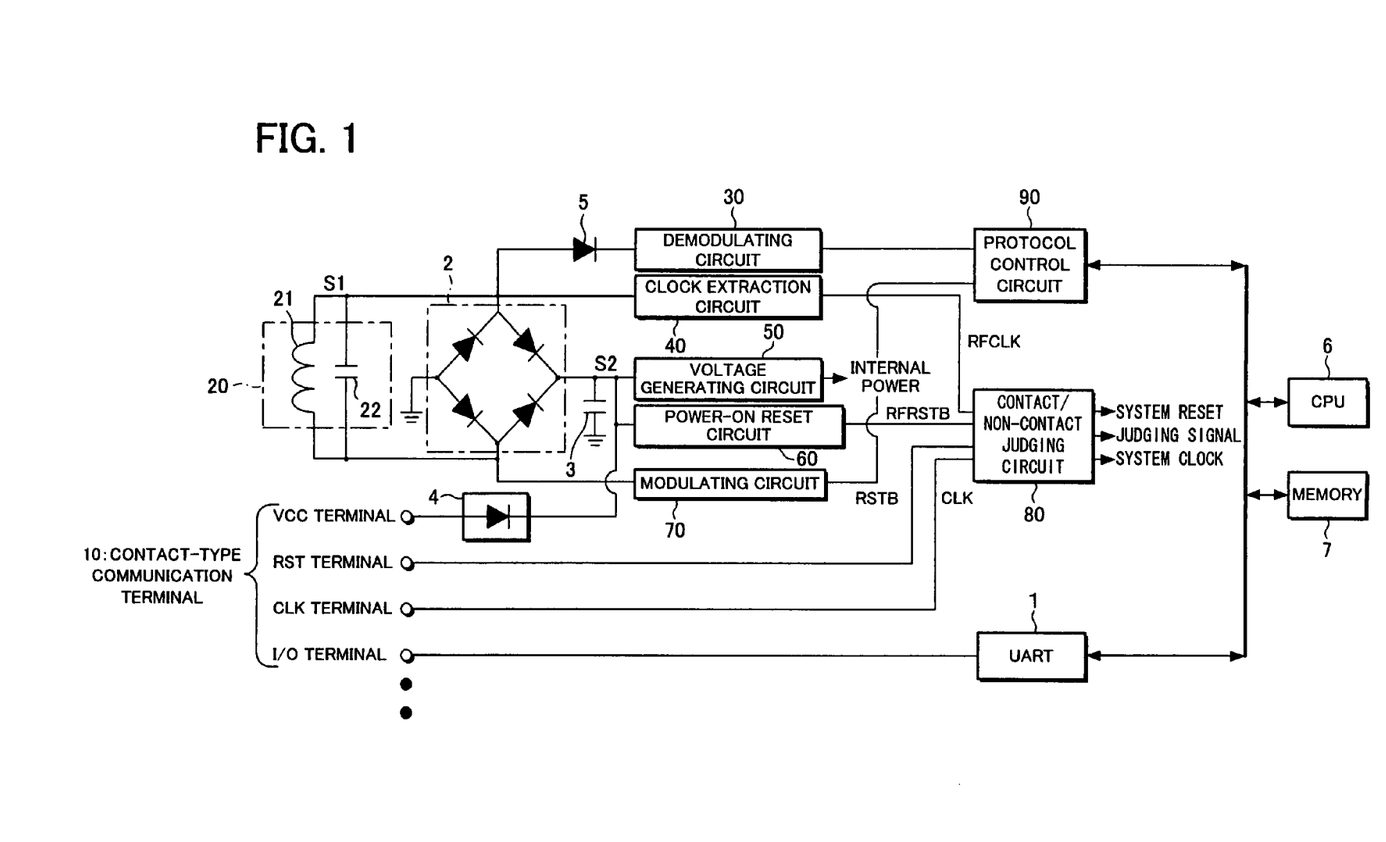
FIG. 1 is a block diagram illustrating an embodiment of a combination-type IC card of the present invention.

A combination-type IC card of the present embodiment is provided with two communication interfaces, namely, contact-type communication terminals (contact communication terminals) 10, which are used as terminals for contact communication, and a non-contact type communication parallel resonance circuit (non-contact communication PR circuit) 20 for non-contact communication.

The contact communication terminals 10 include a power source terminal VCC, a reset (RST) terminal, a clock (CLD) terminal, and an I/O terminal for serial communication. The CLK terminal receives, from outside, a clock CLK for contact communication. The clock CLK for contact communication is outputted to a contact/non-contact judging circuit 80, which will be described later. The RST terminal receives, from outside, a reset signal RSTB for contact communication. The reset signal RST for contact communication is also outputted to the contact/non-contact judging circuit 80. Moreover, the I/O terminal for serial communication is connected to a UART (Universal Asynchronous Receiver Transmitter) 1, which serves as control means for contact communication. Thus, the contact communication via the contact communication terminals is carried out by using the UART 1.

On the other hand, the non-contact communication PR circuit 20 is provided with an antenna coil 21 and a resonance capacitor 22. The antenna coil 21 and the resonance capacitor 22 constitute a parallel resonance circuit. The non-contact communication PR circuit 20 receives a reception signal S1. Then, the reception signal S1 is subjected to half-wave rectification by a bridge diode 2, so as to be a rectified signal S2. The rectified signal S2 is supplied to a voltage generating circuit 50 via a smoothing capacitor 3. Then, the voltage generating circuit 50 generates an internal power. Moreover, the rectified signal S2, which has been subjected to the half-wave rectification, is also supplied to a power-on reset circuit 60. The power-on reset circuit 60 generates a reset signal RFRSTB for non-contact communication, and sends the reset signal RFRSTB to the contact/non-contact judging section 80.

Input terminals of the voltage generating circuit 50 and the power-on reset circuit 60, which receive the rectified signal S2, and the power source terminal VCC of the contact communication terminal 10 are connected with a diode 4. The diode 4 prevents a voltage exited in the antenna coil 21 from appearing in the contact communication terminal 10.

Moreover, the reception signal S1 received by the non-contact communication PR circuit 20 is demodulated by a demodulating circuit 30 via a demodulation diode 5, and then is supplied to a protocol control circuit 90, which servers as control means for non-contact communication. Further, the reception signal S1, which has been received by the non-contact communication PR circuit 20 is supplied to a clock extraction circuit 40, which generates a clock RFCLK for non-contact communication.

The protocol control circuit 90 performs reception of the signal demodulated by the demodulating circuit 30, and transmission by a modulating circuit 70, when the non-contact communication is performed, in which the signal is inputted therein from the non-contact communication PR circuit 20.

The contact/non-contact judging circuit 80 judges whether the communication is the contact type or the non-contact type, judging from a difference in frequencies between the clock RFCLK for non-contact communication, which is generated by the clock extraction circuit 40, and the clock CLK for contact communication, which is supplied from the CLK terminal of the contact communication terminals 10. Then, the contact/non-contact judging circuit 80 outputs a judging signal, accordingly. Further, the contact/non-contact judging circuit 80 generates a system reset signal and a system clock signal.

A CPU 6 and a memory 7 are operated in accordance with the system reset signal and system clock signal thus generated.

Figure 2:
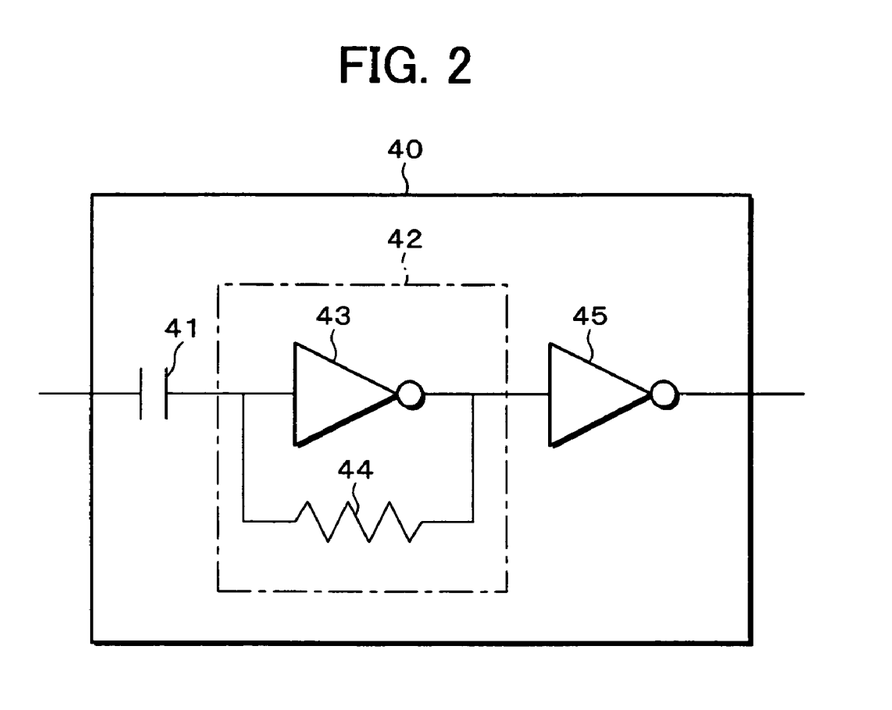
FIG. 2 is a block diagram illustrating an arrangement of a clock extraction circuit for use in the combination-type IC card.

The following describes the clock extraction circuit 40 as setting means, in detail.

As shown in FIG. 2, the clock extraction 40 is provided with (i) a capacitor 41, (ii) an oscillating circuit 42 including an oscillating inverter 43 and a feedback resistor 44, and (iii) a waveform forming inverter 45.

In the clock extraction circuit 40, the capacitor 41 blocks a DC (direct current) component, and the oscillating circuit 42 extracts a signal waveform, and the waveform forming inverter 45 forms a waveform.

When the non-contact communication is performed, the oscillating circuit 42 oscillates at 13.56 MHz, in synchronism with the reception signal S1 from the antenna coil 21. In short, the clock extraction circuit 40, which is used for a non-contact-type card, outputs a frequency of 13.56 MHz in case the reception signal S1 is inputted thereto. Moreover, when the communication is not the non-contact type, the oscillating circuit 42 oscillates at about 1 MHz in the present embodiment. In short, the present embodiment is so arranged that a frequency of active one of the clocks is faster than that of non-active one.

Figure 3:
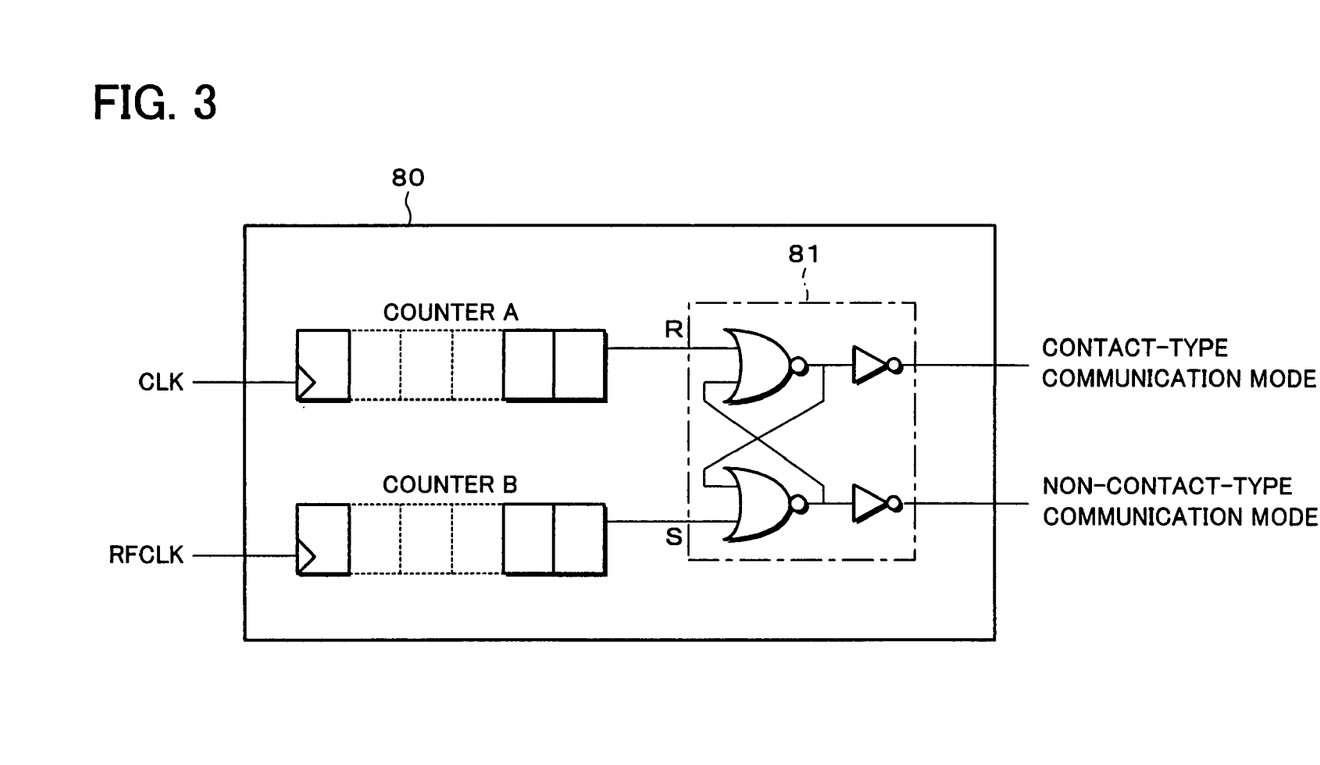
FIG. 3 is a block diagram illustrating an arrangement of a contact/non-contact judging circuit for use in the combination-type IC card.
Figure 4:
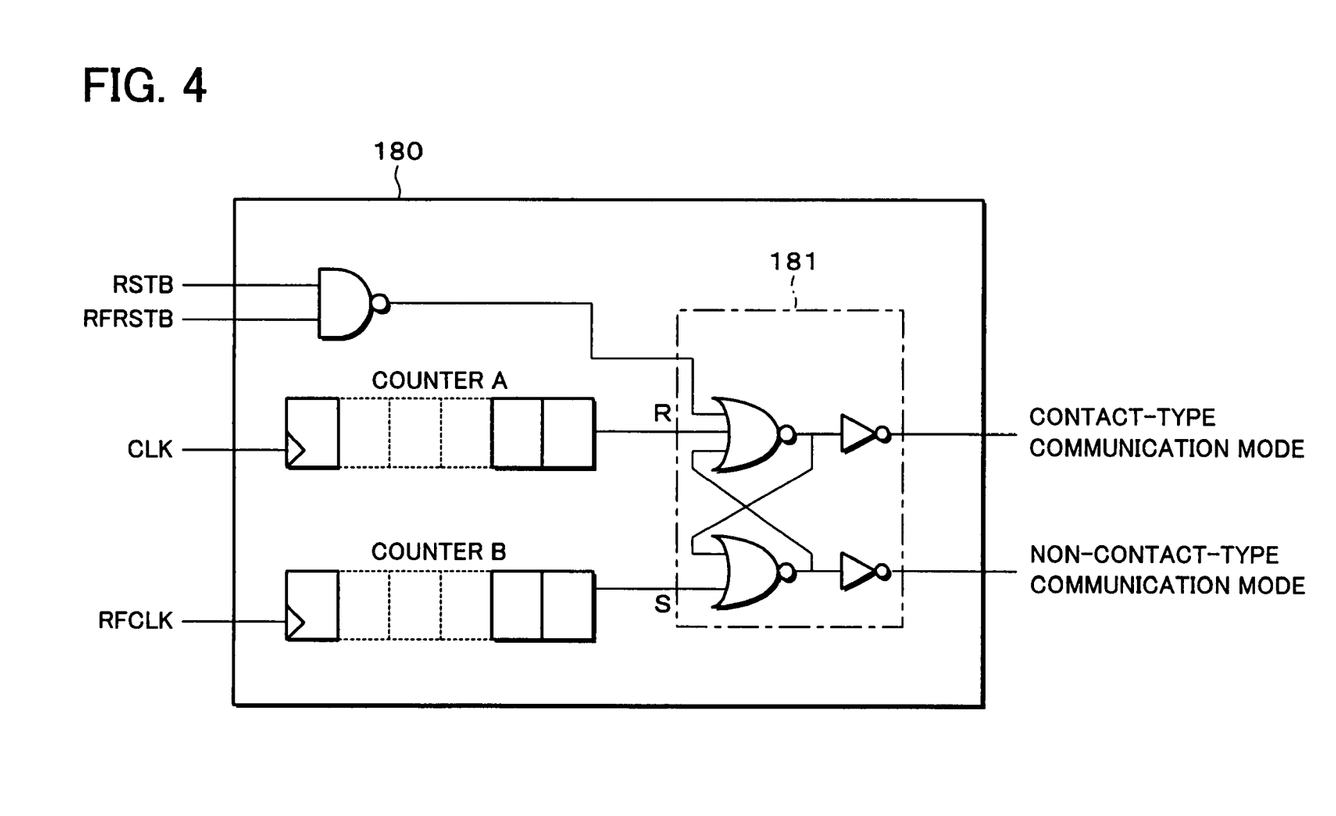
FIG. 4 is a block diagram illustrating an arrangement of another contact/non-contact judging circuit for use in the combination-type IC card.

Note that the oscillating frequency of the oscillating circuit 42 for the case where the communication is not the non-contact type is not limited to 1 MH, but may be 3.5 MHz or any frequency of 4.9 MHz or less. As shown in FIGS. 3 and 4 later discussed, in case where a counter A (clock: 3.5 MHz, 4.9 MHz) for contact communication and a counter B (clock: 13.56 MHz) for non-contact communication are used, both the counters A and B always count the clocks. Thus, it is necessary to operate the counter B at a frequency of 3.5 HMz and 4.9 HMz, lower than that of the contact-type card, when no signal is inputted into the counter B for the non-contact communication.

Next, the contact/non-contact judging circuit 80 is described in detail in terms of its arrangement.

The contact/non-contact judging circuit 80 is, as shown in FIG. 3, counts the clock CLK for contact communication and the clock RFCLK for non-contact communication, by respectively using the counter A for contact communication, and the counter B for non-contact communication. One of the counters A and B that is overflowed before the other is overflowed is held by an RS flip-flop 81. With this arrangement, it is possible to judge whether the communication is the contact-type or the non-contact-type, by judging from a difference between the frequency of the clock CLK for contact communication and the frequency of the clock RFCLK for non-contact communication. Note that in the present embodiment the circuit is so constituted as to work differentially by using the counter A for contact communication and the counter B for non-contact communication. However, the present invention is not limited to this arrangement. It is possible to arrange the present invention such that only one of the counter A for contact-type communication and the counter B for non-contact-type communication is provided.

In the following, another contact/non-contact judging circuit 180 of the present embodiment is described.

As shown in FIG. 4, an RS flip-flop 181 is provided with a reset input, so as to constitute the contact/non-contact judging circuit 180. With this arrangement, it is possible to set that an initial condition is a contact-type communication condition (condition for contact communication). (That is, it is possible to set the combination-type IC card initially in the contact-type communication condition.) By setting the initial condition is the contact-type communication condition, it is possible to realize easy testing for products before shipping.

Figure 5:
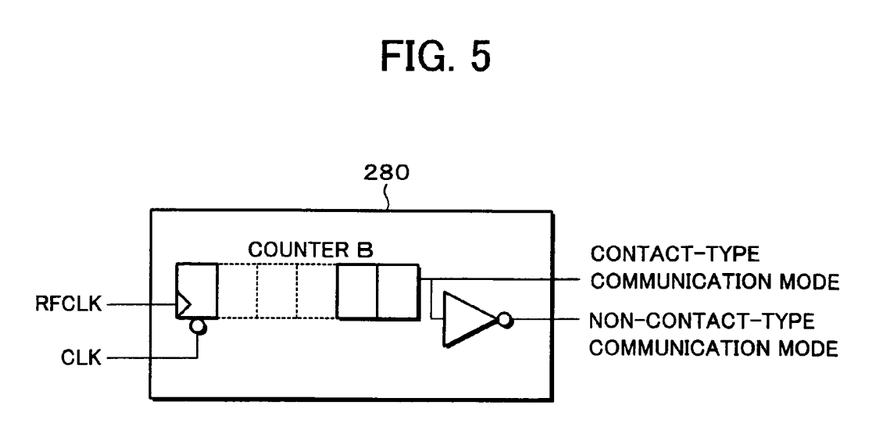
FIG. 5 is a block diagram illustrating still another contact/non-contact judging circuit for use in the combination-type IC card.

Next, referring to FIG. 5, described is still another contact/non-contact judging circuit 280 of the present embodiment, which is used for a case where a contact-type communication condition is given preference.

When a combination-type IC card of the present embodiment is about to be used in a contact-type communication mode, problems such as cross talk would be caused due to existence of a machine for non-contact communication in vicinity.

Therefore, in the present embodiment, as shown in FIG. 5, a value of a counter B for non-contact communication, which counts a clock RFCLK for non-contact communication, is cleared by using a clock CLK for contact communication. In this way, it is possible to give preference to the contact communication (the contact communication is preferentially carried out) when cross talk occurs, that is, when there is no difference between a frequency of a clock for contact communication and that of a clock for non-contact communication.

Specifically, a clock of high frequency (for non-contact communication; 13.56 MHz) is supplied to an input terminal of the counter B for non-contact communication. However, before the clock of high frequency entering into the input terminal, reset is carried out all the time by using a clock of low frequency (for contact communication; 3.5 MHz or 4.9 MHz). In this case, no counter output is outputted (that is, output is "0"). Accordingly, the contact-type communication mode is chosen in accordance with a reverse output, which is reverse to the counter output.

The following discusses an arrangement of yet another contact/non-contact judging circuit 380 of the present embodiment, referring to FIGS. 6, and 7(a) to 7(d). The contact/non-contact judging circuit 380 generates a system reset signal after the judging as to whether communication is the contact-type communication or the non-contact type communication.

Figure 7:
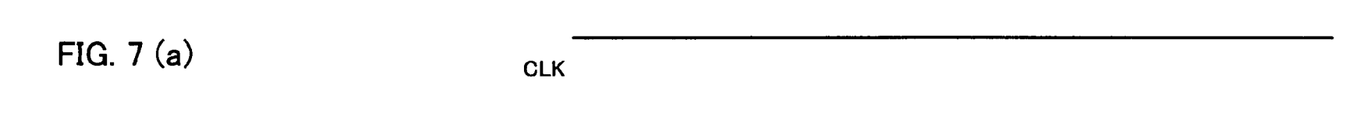
FIGS. 7(a) to 7(d) are waveform charts illustrating how the contact/non-contact judging circuit operates.

Specifically, in the vicinity of the start of the operation of the combination-type IC card in the non-contact-type communication mode in FIG. 7, (that is, immediately after the operation in the non-contact communication mode is started), operation of a combination-type IC card has not been stabilized yet. When the combination-type IC card is in such unstable condition, counters are also in an unstable condition. Even if counting is carried out normally, stable operation of a CPU 6, a memory 7, and the like member provided in the combination-type IC card is not ensured right after the operation of the combination-type IC card is started, because in the non-contact communication mode the combination-type IC card is supplied with a power in a form of an electromagnetic wave from outside. Thus, it is preferable that a whole system is reset after judging that the communication is non-communication type, and then the judging as to whether the communication is the contact-type or the non-contact type is redone intentionally.

Figure 6:
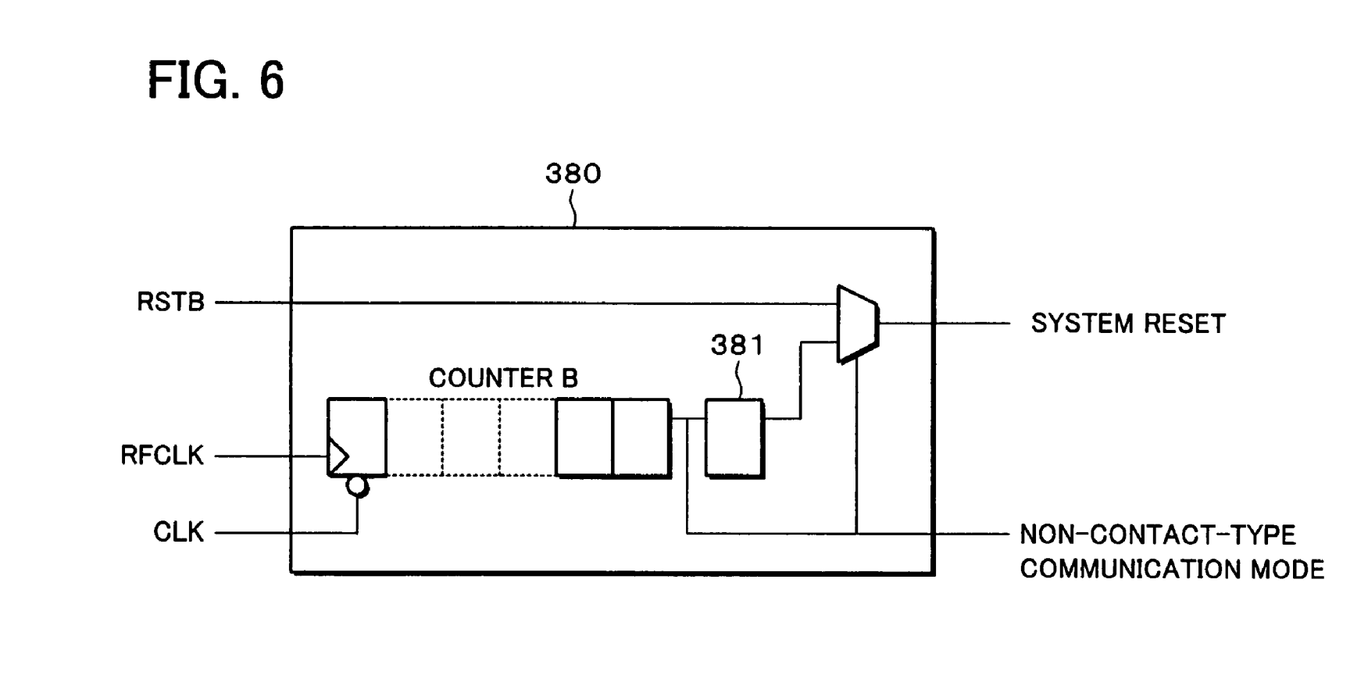
FIG. 6 is a block diagram illustrating yet another contact/non-contact judging circuit for use in the combination-type IC card.

For this reason, in the present embodiment, as shown in FIG. 6, a counter B for non-contact communication is provided with a 1-bit 381, which serves as a reset signal generating means. An output of the 1-bit 381 is used as a system reset signal for use in the non-contact communication condition. The system is surely reset by the system reset signal, after it is judged that the communication is the non-contact type. That is, as shown in FIG. 7(c), the system reset signal is kept to be "0" for a predetermined period of time when the non-contact communication mode is in a HIGH state. As a result, the system is reset, thereby eliminating a period in which unstable non-contact type communication is carried out. Thus, it is possible to carry out stable communication.

Figure 8:
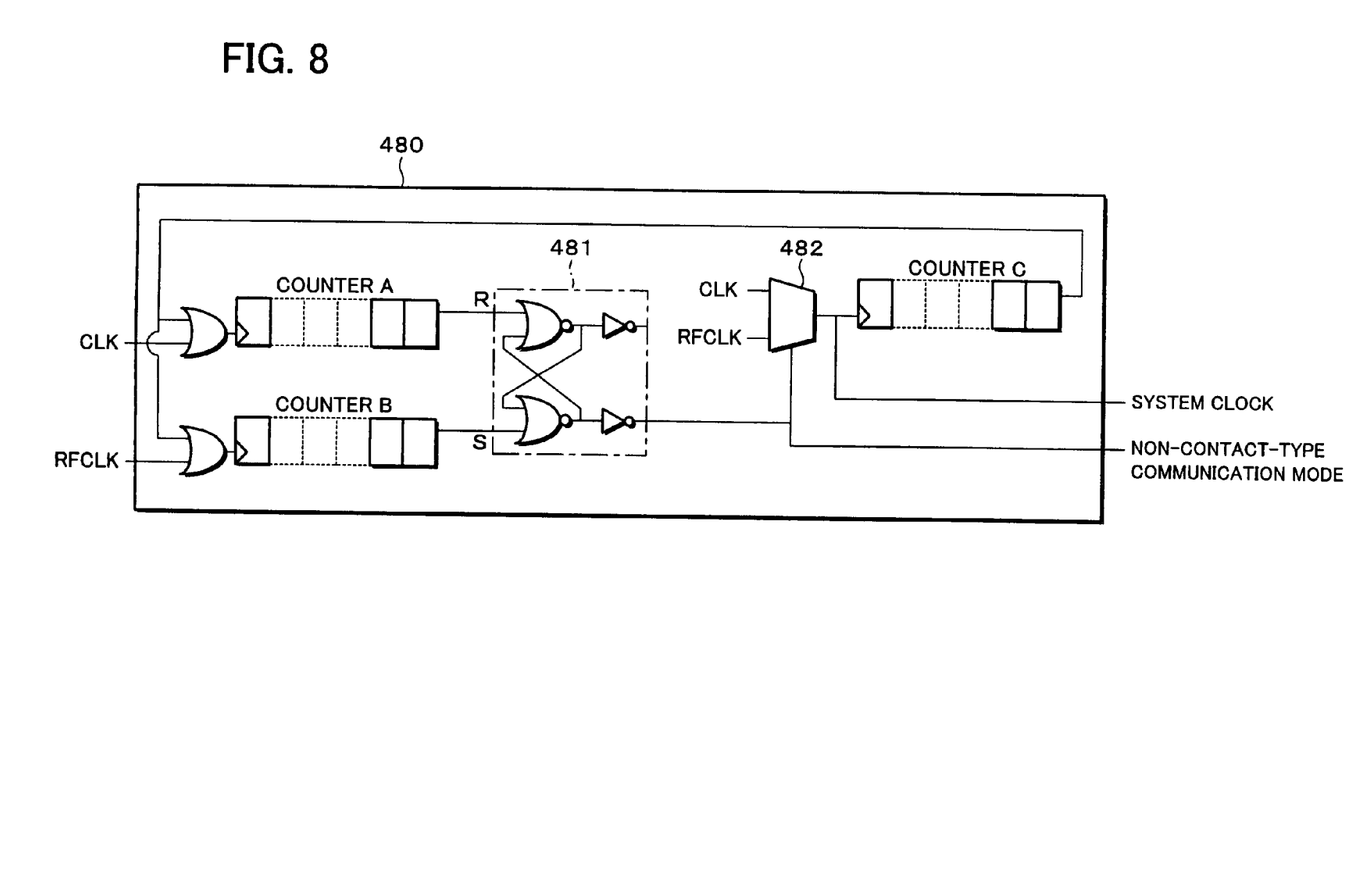
FIG. 8 is a block diagram illustrating still yet another contact/non-contact judging circuit for use in the combination-type IC card.

Referring to FIG. 8, described below is an arrangement of still yet another contact/non-contact judging circuit 480 of the present embodiment for holding a result of judging as to whether the communication is the contact-type or the non-contact type, after the judging is carried out.

The counters for judging whether the communication is the contact type or the non-contact type are respectively connected to the input terminals for clocks. Where this arrangement is simply applied, there is a possibility that the combination-type IC card may be affected from the electromagnetic wave and the like from a machine to which the combination-type IC card is communicating, or from outside, after the result of the judging has been obtained. As a result, this may cause erroneous operation. In order to solve this problem, in the present embodiment, operation of the counters for judging are terminated after the judging as to whether the communication is the contact type or the non-contact type is carried out.

Specifically, as shown in FIG. 8, the contact/non-contact judging circuit 480 is provided with a selector 482, which serves as judging result holding means. The selector 482 switches over system clocks in accordance with a result of judging as to whether the communication is the contact type or the non-contact type. In accordance with the system clocks, a clock that is to be supplied to the contact/non-contact judging circuit 480 is blocked after a certain period after a counter C finishes counting. With this arrangement, it is possible to hold the result of the judging.

As described above, in the combination-type IC cards of the present embodiment, each of the contact/non-contact judging circuits 80, 180, 280, 380, and 480 judges whether the communication is the contact type or the non-contact type, by judging from a difference between (i) the frequency of the clock CLK for contact communication, which is supplied from the CLK terminal, which is one of the contact communication terminals 10, and (ii) the frequency of the clock RFCLK for non-contact communication, which is received via the antenna coil 21.

Because the clock CLK for contact communication and the clock RFCLK for non-contact communication to be supplied to the combination-type IC card are so distinctly different in terms of frequency, it is possible to provide a combination-type IC card capable of accurately and stably judging whether the communication is the contact type or the non-contact type, by discriminating between the frequencies.

Moreover, in each combination-type IC card of the present embodiment, the clock extraction circuit 40 sets the frequency of the clock CLK for the contact communication, and the frequency of the clock RFCLK for non-contact communication, the clock CLK being supplied from the clock (CLK) terminal, and the clock RFCLK being supplied from the antenna coil 21. The clock extraction circuit 40 sets so that active one of the frequencies of the clock CLK and the clock RFCLK will be faster than the non-active one.

Therefore, the clock extraction circuit 40 may be so designed that, when the non-contact communication is carried out, the frequency of the clock CLK is slower than that of the clock RFCLK, while the frequency of the clock RFCLK is slower than that of the clock CLK, when the contact communication is carried out.

This makes it possible to provide a combination-type IC card capable of accurately and stably judging whether the communication is the contact type or the non-contact type.

Moreover, in each combination-type IC card of the present embodiment, individually provided are (i) the UART 1 for controlling data communication that is performed via the contact communication terminals 10, which is the interface for contact communication, and (ii) the protocol control circuit 90 for controlling data communication that is performed via the non-contact communication PR circuit 20, which is the interface for non-contact communication.

Therefore, it is possible to realize the contact-type communication and the non-contact type communication.

Moreover, in the combination-type IC card of the embodiment, the RS flip-flop 81 provided in the contact/non-contact judging circuit 80 initially keeps the combination-type IC card in the contact communication condition, and switches over the combination-type IC card to the non-contact communication when the clock RFCLK for non-contact communication has a frequency stipulated in a protocol.

Specifically, in case of the non-contact communication, it is necessary to wait a certain length of time until operation of the combination-type IC card. Therefore, in terms of its functions not related to the non-contact communication, it is more efficient to test the combination-type IC card in the contact communication mode. The test would take more time inefficiently if the combination-type IC card was tested in the non-contact mode. Therefore, by initially setting the combination-type IC card in the contact communication mode, it is possible to easily carry out the test in which the contact communication is used.

Moreover, in case the clock RFCLK for non-contact communication has the frequency stipulated in the protocol, the RS flip-flop 81 switches over to the non-contact communication condition. With this arrangement, it is possible to surely carry out the non-contact communication.

Moreover, in the combination-type IC card of the present embodiment, the contact/non-contact judging circuit 280 performs the contact-type communication preferentially in case where there is no difference between the clock CLK for contact communication and the clock RFCLK for non-contact communication.

With such arrangement in which the contact communication is preferentially carried out when cross talk occurs between the contact-type communication and the non-contact-type communication, the communication can be carried out stably even under such environment in which such cross talk may occur.

Moreover, in the combination-type IC card of the present embodiment, the 1-bit 381 generates the system reset signal after the judging as to whether the communication is the contact communication or the non-contact communication is carried out.

With this arrangement, as a result, it is possible to reset the whole system once, after it is judged that the communication is in the non-contact communication mode, and then to redo the judging as to whether the communication is the contact-type communication and the non-contact-type communication.

Therefore, with the arrangement in which the system reset is generated after the judging as to whether the communication is the contact-type communication or the non-contact-type communication is carried out, it is possible to avoid erroneous operation of an internal circuit.

Moreover, in the combination-type IC card of the present embodiment, the selector 482 holds a result of judging, after the judging as to whether the communication is the contact-type communication or the non-contact-type communication is carried out. Thus, after the judging as to whether the communication is the contact-type communication or the non-contact-type communication, the result of the judging is held so that the result of the judging will not be changed due to noise and the like. With this arrangement, it is possible to realize stable communication even under a noisy environment. As a result, it is possible to realize normal operation of the combination-type IC card even after the judging in terms of the types of the communication is carried out.

As described above, in order to solve the forgoing problems, a combination-type IC card of the present invention provided with both of (i) a contact-type interface for reading and writing data transmitted via contact terminals provided in the combination-type IC card, and (ii) a non-contact-type interface for receiving, via an antenna coil, data transmitted thereto via radio waves, and for reading and writing the data thus transmitted thereto, the combination-type IC card characterized by comprising judging means for judging whether communication is contact-type communication or non-contact type communication, by judging from a difference between a frequency of a clock for contact-type communication, and a frequency of a clock for non-contact type communication, the clock for contact-type communication being received via a CLK terminal, which is one of the contact-type terminals, and the non-contact-type clock being received via the antenna coil.

In the above invention, the judging means judges whether communication is contact-type communication or non-contact type communication, by judging from the difference between the frequency of a clock for contact-type communication and the frequency of a clock for non-contact type communication, the clock for contact-type communication being received via the CLK terminal, which is one of the contact-type terminals, and the non-contact-type clock being received via the antenna coil.

Because the clock for contact communication and the clock for non-contact communication to be supplied to the combination-type IC card are so distinctly different in terms of frequency, it is possible to provide a combination-type IC card capable of accurately and stably judging whether the communication is the contact type or the non-contact type, by discriminating between the frequencies.

Moreover, a combination-type IC card of the present invention having the above arrangement is further provided with setting means for setting so that a frequency of active one of the clock for contact-type communication and the clock for non-contact-type communication will be faster than a frequency of non-active one of the clock for contact-type communication and the clock for non-contact-type communication.

For judging the frequency of the clock for contact-type communication and that of the clock for non-contact-type communication, it is necessary that both the clocks are in an ON-state. However, if both the clocks have the same frequency, it is impossible to distinguish one of the clocks from the other.

Thus, in the present invention, the setting means sets so that a frequency of active one of the clock for contact-type communication and the clock for non-contact-type communication will be faster than a frequency of non-active one of the clock for contact-type communication and the clock for non-contact-type communication.

Thus, it is possible to arrange the setting means such as a clock extraction circuit for non-contact-type communication as follows: in the non-contact-type communication, the frequency of the clock for contact-type communication is slower than that of the clock for non-contact-type communication the clock for contact-type supplied from the CLK terminal and the clock for non-contact-type communication supplied from the antenna coil; and in the contact-type communication, the frequency of the clock for non-contact-type communication is slower than that of the clock for contact-type communication.

As a result, it is possible to provide a combination-type IC card capable of accurately and stably judging whether the communication is the contact-type communication or the non-contact-type communication.

Furthermore, a combination-type IC card of the present invention having the above arrangement is further provided with control means for contact-type communication, for controlling communication of data via the contact-type interface; and control means for non-contact-type communication, for controlling communication of data via the non-contact-type interface, the control means for contact-type communication and the control means for non-contact-type communication being provided individually.

In the above invention, individually provided are the control means for contact-type communication, which is for controlling communication of data via the contact-type interface, and the control means for non-contact-type communication, which is for controlling communication of data via the non-contact-type interface.

With this arrangement, it is possible to realize the contact-type communication and the non-contact-type communication.

Moreover, a combination-type IC card of the present invention having the above arrangement is so arranged that the judging means includes switching means for initially holding the combination-type IC card in a condition for contact-type communication, and for switching over the combination-type IC card to a condition for non-contact-type communication when the clock for non-contact-type communication has a frequency stipulated in a protocol.

In the above invention, the switching means initially holds the combination-type IC card in the condition for contact-type communication, and switches over the combination-type IC card to a condition for non-contact-type communication when the clock for non-contact-type communication has the frequency stipulated in a protocol.

In case of the non-contact-type communication, it is necessary to wait a certain length of time until operation of the combination-type IC card is stabilized. Thus, in terms of its functions not related to the non-contact communication, it is more efficient to test the combination-type IC card in the contact communication mode. The test would take more time inefficiently if the combination-type IC card was tested in the non-contact mode. Therefore, by initially setting the combination-type IC card in the contact communication mode, it is possible to easily carry out the test in which the contact communication is used.

Moreover, when the clock for non-contact-type communication has the frequency stipulated in a protocol, the switching means switches over the combination-type IC card to a condition for non-contact-type communication. Thus, according to this arrangement, it is possible to surely perform the non-contact-type communication.

Moreover, the combination-type IC card of the present invention having the above arrangement is so arranged that the judging means gives preference to the contact-type communication when there is no difference between the frequency of the clock for contact-type communication and the frequency of the clock for non-contact-type communication.

In the above invention, the judging means gives preference to the contact-type communication when there is no difference between the frequency of the clock for contact-type communication and the frequency of the clock for non-contact-type communication.

With such arrangement in which the contact communication is preferentially carried out when cross talk occurs between the contact-type communication and the non-contact-type communication, the communication can be carried out stably even under such environment in which such cross talk may occur.

Moreover, a combination-type IC card of the present invention having the above arrangement is further provided with reset signal generating means for generating a system reset signal after the judging means judged whether the communication is the contact-type communication or the non-contact-type communication.

In the vicinity of the start of the operation of the combination-type IC card in the non-contact-type communication mode in FIGS. 7(a) to 7(d) (that is, immediately after the operation in the non-contact communication mode is started), operation of a combination-type IC card has not been stabilized yet. Thus, in the present invention, the reset signal generating section generates a system reset signal after the judging section judged whether the communication is the contact-type communication or the non-contact-type communication.

With this arrangement, it is possible to reset a whole system after it is judged that the communication is in a non-contact-type communication mode, and then to redo the judging as to whether the communication is the contact-type communication or the non-contact-type communication.

The arrangement in which the system reset is carried out after judging whether the communication is the contact-type or the non-contact-type prevents erroneous operation of the internal circuit.

Moreover, the combination-type IC card of the present invention having the above arrangement is further provided with judging result holding means for holding a result of judging, after the judging means judged whether the communication is the contact-type communication or the non-contact-type communication.

As discussed above, it is necessary to wait a certain length of time until operation is stabilized, for the non-contact type card, which starts operating by receiving, from the machine, a signal and an energy in a form of an electromagnetic wave.

Thus, in the present invention, the judging result holding means holds a result of the judging, after the judging as to whether the communication is the contact-type communication or the non-contact-type communication is carried out. Thus, after the judging as to whether the communication is the contact-type communication or the non-contact-type communication is carried out, the result of the judging is held so that the result of the judging will not be changed due to noise and the like. With this arrangement, it is possible to realize stable communication even under a noisy environment. As a result, it is possible to realize normal operation of the combination-type IC card even after the judging in terms of the types of the communication is carried out.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A combination-type IC card comprising:
    a contact-type interface for reading and writing data transmitted via contact terminals provided in the combination-type IC card;
    a non-contact-type interface for receiving, via an antenna coil, data transmitted thereto via radio waves, and for reading and writing the data thus transmitted thereto;
    judging means for judging whether communication is contact-type communication or non-contact-type communication, by judging from a difference between a frequency of a clock for contact-type communication, and a frequency of a clock for non-contact-type communication, the clock for contact-type communication being received via a CLK terminal, which is one of the contact-type terminals, and the non-contact-type clock being received via the antenna coil; and
    a selector for holding a result of judging, after the judging means judged whether the communication is the contact-type communication or the non-contact-type communication.

2. A combination-type IC card as set forth in claim 1, further comprising:
    setting means for setting so that a frequency of active one of the clock for contact-type communication and the clock for non-contact-type communication will be faster than a frequency of non-active one of the clock for contact-type communication and the clock for non-contact-type communication.

3. A combination-type IC card as set forth in claim 2, further comprising:
    control means for contact-type communication, for controlling communication of data via the contact-type interface; and
    control means for non-contact-type communication, for controlling communication of data via the non-contact-type interface,
    the control means for contact-type communication and the control means for non-contact-type communication being provided individually.

4. The combination-type IC card as set forth in claim 3, wherein:
    the judging means includes switching means for initially holding the combination-type IC card in a condition for contact-type communication, and for switching over the combination-type IC card to a condition for non-contact-type communication when the clock for non-contact-type communication has a frequency stipulated in a protocol.

5. The combination-type IC card as set forth in claim 3, wherein:
    the judging means gives preference to the contact-type communication when there is no difference between the frequency of the clock for contact-type communication and the frequency of the clock for non-contact-type communication.

6. A combination-type IC card as set forth in claim 3, further comprising:
    reset signal generating means for generating a system reset signal after the judging means judged whether the communication is the contact-type communication or the non-contact-type communication.

7. The combination-type IC card as set forth in claim 2, wherein:

the judging means includes switching means for initially holding the combination-type IC card in a condition for contact-type communication, and for switching over the combination-type IC card to a condition for non-contact-type communication when the clock for non-contact-type communication has a frequency stipulated in a protocol.

8. The combination-type IC card as set forth in claim 2, wherein:
the judging means gives preference to the contact-type communication when there is no difference between the frequency of the clock for contact-type communication and the frequency of the clock for non-contact-type communication.

9. A combination-type IC card as set forth in claim 2, further comprising:
reset signal generating means for generating a system reset signal after the judging means judged whether the communication is the contact-type communication or the non-contact-type communication.

10. A combination-type IC card as set forth in claim 1, further comprising:
control means for contact-type communication, for controlling communication of data via the contact-type interface; and
control means for non-contact-type communication, for controlling communication of data via the non-contact-type interface,
the control means for contact-type communication and the control means for non-contact-type communication being provided individually.

11. The combination-type IC card as set forth in claim 10, wherein:
the judging means includes switching means for initially holding the combination-type IC card in a condition for contact-type communication, and for switching over the combination-type IC card to a condition for non-contact-type communication when the clock for non-contact-type communication has a frequency stipulated in a protocol.

12. The combination-type IC card as set forth in claim 10, wherein:
the judging means gives preference to the contact-type communication when there is no difference between the frequency of the clock for contact-type communication and the frequency of the clock for non-contact-type communication.

13. A combination-type IC card as set forth in claim 10, further comprising:
reset signal generating means for generating a system reset signal after the judging means judged whether the communication is the contact-type communication or the non-contact-type communication.

14. The combination-type IC card as set forth in claim 1, wherein:
the judging means includes switching means for initially holding the combination-type IC card in a condition for contact-type communication, and for switching over the combination-type IC card to a condition for non-contact-type communication when the clock for non-contact-type communication has a frequency stipulated in a protocol.

15. The combination-type IC card as set forth in claim 1, wherein:
the judging means gives preference to the contact-type communication when there is no difference between the frequency of the clock for contact-type communication and the frequency of the clock for non-contact-type communication.

16. A combination-type IC card as set forth in claim 1, further comprising:
reset signal generating means for generating a system reset signal after the judging means judged whether the communication is the contact-type communication or the non-contact-type communication.

17. A combination-type IC card as set forth in claim 1, wherein,
one of the contact-type communication clock and non-contact-type communication clock is active and the other is inactive, and
the combination IC card further comprising,
setting means for setting the frequency of the active clock such that the frequency of the active clock is greater than the frequency of the inactive clock.

18. A combination-type IC card comprising:
a contact-type interface;
a non-contact-type interface; and
means for determining whether a communication is contact-type communication or non-contact-type communication based upon a difference between a frequency of a clock for contact-type communication, and a frequency of a clock for non-contact-type communication; wherein
one of the contact-type communication clock and non-contact-type communication clock is active and the other is inactive, and
the combination IC card further comprises,
setting means for setting the frequency of the active clock such that the frequency of the active clock is greater than the frequency of the inactive clock, and
selector for holding a result output from the means for determining, after the means for determining determines whether the communication is contact-type communication or non-contact-type communication.

19. The combination-type IC card as set forth in claim 18, wherein:
the means for determining further includes,
switching means for switching the combination-type IC card to communicate via non-contact-type communication when the clock for non-contact-type communication has a frequency stipulated in a protocol.

20. The combination-type IC card as set forth in claim 18, wherein:
when there is no difference between the frequency of the clock for contact-type communication and the frequency of the clock for non-contact-type communication, the means for determining determines that communication is via contact-type communication.

21. A combination-type IC card as set forth in claim 18, further comprising:
control means for contact-type communication, for controlling communication of data via the contact-type interface; and
control means for non-contact-type communication, for controlling communication of data via the non-contact-type interface; wherein
the control means for contact-type communication and the control means for non-contact-type communication are separately provided.

22. A combination-type IC card comprising:
a contact-type interface;

a non-contact-type interface; and a device adapted to determine whether a communication is contact type communication or non-contact type communication based upon a difference between a frequency of a clock for contact-type communication, and a frequency of a clock for non-contact-type communication, wherein, one of the contact-type communication clock and non-contact-type communication clock is active and the other is inactive, and the combination IC card further comprises, another device adapted to set the frequency of the active clock such that the frequency of the active clock is greater than the frequency of the inactive clock, and a selector adapted to hold a result output from the device, after the device determines whether the communication is contact-type communication or non-contact-type communication.

23. The combination-type IC card as set forth in claim 22, wherein:

the device further includes a switch adapted to switch the combination-type IC card to communicate via non-contact-type communication when the clock for non-contact-type communication has a frequency stipulated in a protocol.

24. The combination-type IC card as set forth in claim 22, wherein:

when there is no difference between the frequency of the clock for contact-type communication and the frequency of the clock for non-contact-type communication, the device determines that communication is via contact-type communication.

25. A combination-type IC card as set forth in claim 22, further comprising:

a controller for contact-type communication, adapted control communication of data via the contact-type interface; and a controller for non-contact-type communication, adapted to control communication of data via the non-contact-type interface; wherein the controller for contact-type communication and the controller for non-contact-type communication are separately provided.

26. A combination-type IC card comprising:

a contact-type interface for reading and writing data transmitted via contact terminals provided in the combination-type IC card;

a non-contact-type interface for receiving, via an antenna coil, data transmitted thereto via radio waves, and for reading and writing the data thus transmitted thereto;

judging means for judging whether communication is contact-type communication or non-contact-type communication, by judging from a difference between a frequency of a clock for contact-type communication, and a frequency of a clock for non-contact-type communication, the clock for contact-type communication being received via a CLK terminal, which is one of the contact-type terminals, and the non-contact-type clock being received via the antenna coil; and judging result holding means for holding a result of judging, after the judging means judged whether the communication is the contact-type communication or the non-contact-type communication; wherein the judging means gives preference to the contact-type communication when there is no difference between the frequency of the clock for contact-type communication and the frequency of the clock for non-contact-type communication.

27. A combination-type IC card comprising:

a contact-type interface;

a non-contact-type interface; and means for determining whether a communication is contact-type communication or non-contact-type communication based upon a difference between a frequency of a clock for contact-type communication, and a frequency of a clock for non-contact-type communication; wherein one of the contact-type communication clock and non-contact-type communication clock is active and the other is inactive, and the combination IC card further comprises, setting means for setting the frequency of the active clock such that the frequency of the active clock is greater than the frequency of the inactive clock, and holding means for holding a result output from the means for determining, after the means for determining determines whether the communication is contact-type communication or non-contact-type communication, wherein when there is no difference between the frequency of the clock for contact-type communication and the frequency of the clock for non-contact-type communication, the means for determining determines that communication is via contact-type communication.

28. A combination-type IC card comprising:

a contact-type interface;

a non-contact-type interface; and a device adapted to determine whether a communication is contact type communication or non-contact type communication based upon a difference between a frequency of a clock for contact-type communication, and a frequency of a clock for non-contact-type communication, wherein, one of the contact-type communication clock and non-contact-type communication clock is active and the other is inactive, and the combination IC card further comprises, another device adapted to set the frequency of the active clock such that the frequency of the active clock is greater than the frequency of the inactive clock, and a holder adapted to hold a result output from the device, after the device determines whether the communication is contact-type communication or non-contact-type communication, wherein when there is no difference between the frequency of the clock for contact-type communication and the frequency of the clock for non-contact-type communication, the device determines that communication is via contact-type communication.

* * * * *